United States Patent
Tang et al.

(10) Patent No.: US 8,284,516 B1
(45) Date of Patent: Oct. 9, 2012

(54) PMR WRITE HEAD WITH ASSISTED MAGNETIC LAYER

(75) Inventors: Yuhui Tang, Milpitas, CA (US); Lijie Guan, Milpitas, CA (US); Tai Min, San Jose, CA (US); Suping Song, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/066,178

(22) Filed: Apr. 8, 2011

(51) Int. Cl.
*G11B 5/127* (2006.01)
(52) U.S. Cl. ................................. 360/125.03
(58) Field of Classification Search ............ 360/125.03, 360/123.02, 123.12, 125.15, 125.06, 125.3, 360/125.17, 125.13, 125.31, 125.02, 125.05, 360/123.06, 125.01; 29/603.01, 603.16
See application file for complete search history.

(56) References Cited

U.S. PATENT DOCUMENTS

| | | | |
|---|---|---|---|
| 6,530,141 B2 | 3/2003 | Komuro et al. | |
| 7,657,992 B2 | 2/2010 | Han et al. | |
| 8,169,731 B2* | 5/2012 | Mizuno et al. | 360/59 |
| 2010/0091415 A1* | 4/2010 | Yuasa et al. | 360/324 |
| 2010/0149697 A1 | 6/2010 | Nunokawa et al. | |
| 2010/0157484 A1 | 6/2010 | Etoh et al. | |
| 2011/0222184 A1* | 9/2011 | Komura et al. | 360/59 |
| 2011/0255197 A1* | 10/2011 | Tsuchiya et al. | 360/245.3 |

OTHER PUBLICATIONS

"A soft magnetic underlayer with negative uniaxial magnetocrystalline anisotropy for suppression of spike noise and wide adjacent track erasure in perpendicular recording media," by Atsushi Hashimoto et al., Journal of Applied Physics 99, 08Q907 (2006), pp. 1-3.
"A novel crystalline soft magnetic intermediate layer for perpendicular recording media," by Soyoung Park et al., Journal of Applied Physics 105, 07B723(2009), pp. 1-3.
"Magnetocrystalline Anisotropy for Alpha'-Fe—C and Alpha'-Fe—N. Films," by Migaku Takahashi et al., IEEE Transactions on Magnetics, vol. 37, No. 4, Jul. 2001, pp. 2179-2181.
"Co-7% Ir Soft Magnetic Intermediate Layer for Perpendicular Media," by Soyoung Park et al., IEEE Transactions on Magnetics, vol. 46, No. 6, Jun. 2010, pp. 2278-2281.
Co-pending U.S. Appl. No. 13/066,095, filed Apr. 6, 2011, "PMR Write Head with Narrow Gap for Minimal Internal Flux Loss," assigned to the same assignee as the present invention, 36 pgs.

* cited by examiner

*Primary Examiner* — Allen Cao
(74) *Attorney, Agent, or Firm* — Saile Ackerman LLC; Stephen B. Ackerman

(57) ABSTRACT

A PMR writer is disclosed wherein a magnetic assist layer (MAL) made of an anisotropic (−Ku) or (+Ku) magnetic material is formed along a main pole trailing side to optimize the vertical magnetic field and field gradient at the air bearing surface. A Ru seed layer is formed between the main pole and (−Ku) MAL to induce a hard axis direction toward the main pole. A (−Ku) MAL is preferably comprised of hcp-CoIr while CoPt and FePt are examples of a (+Ku) MAL. The MAL has a down-track thickness from 5 to 20 nm, a width equal to the track width in a cross-track direction, and extends 100 to 500 nm in a direction toward a back end of the main pole. As a result, flux leakage from the main pole to trailing shield is reduced and aerial density is increased. A method for fabricating the PMR writer is provided.

23 Claims, 5 Drawing Sheets

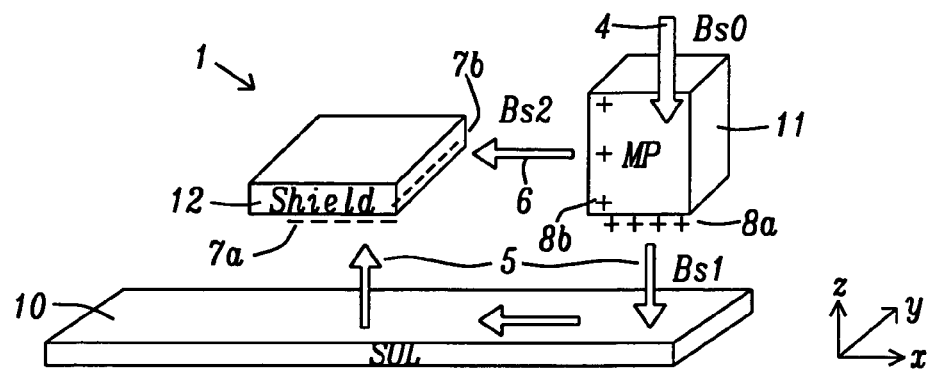
FIG. 1 – Prior Art
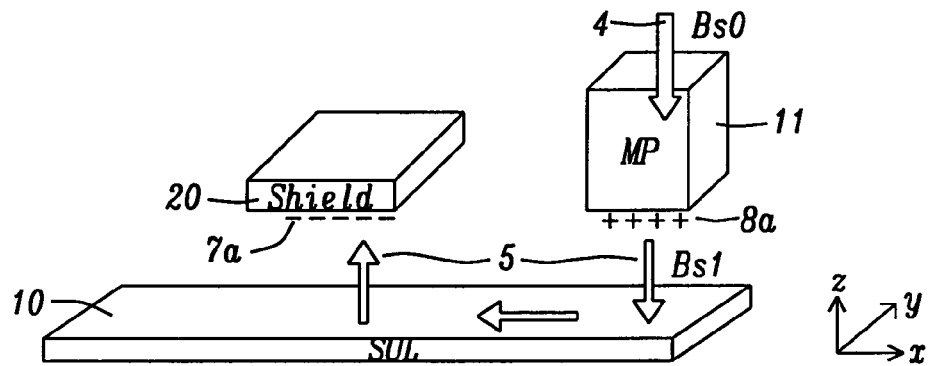
FIG. 2
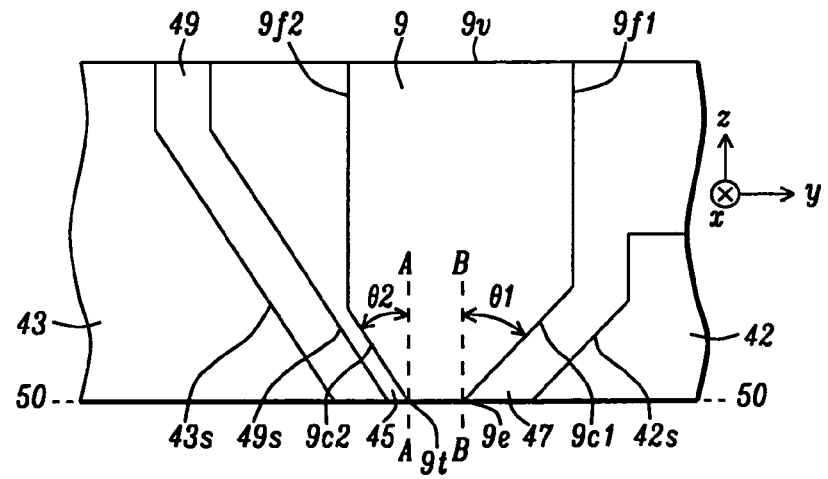
FIG. 3

PMR WRITE HEAD WITH ASSISTED MAGNETIC LAYER

RELATED PATENT APPLICATION

This application is related to the following: Ser. No. 13/066,095; filing date Apr. 6, 2011 and now issued as U.S. Pat. No. 8,238,059; assigned to a common assignee, and herein incorporated by reference in its entirety.

FIELD OF THE INVENTION

The invention relates to a thin magnetic film with an anisotropic magnetic property that is added to the trailing side of a main pole and thereby provides additional magnetic charge on the ABS surface to improve writability and field gradient.

BACKGROUND OF THE INVENTION

In today's perpendicular magnetic recording (PMR) technology, an all wrapped around (AWA) shield writer is widely used by the major hard disk drive (HDD) manufacturers. The function of a trailing shield in an AWA structure is to improve the magnetic field gradient along a down track direction which is a key requirement for high bits per inch (BPI). Meanwhile, side shields and a leading shield serve to define a narrower writer bubble which is important for realizing higher tracks per inch (TPI). In order to achieve higher area density (i.e. higher BPI and TPI) in advanced writer designs, the gap between the main pole and all shields, including the write gap adjoining the trailing shield, side gaps to the side shields, and lead gap next to the leading shield must be as narrow as possible. However, the material used for conventional AWA shields is a soft magnetic material without preferred anisotropy. Therefore, narrowing the gap between a shield and main pole will only lead to an unwanted flux path from the main pole to the shield which in turn reduces the writability (magnetic field) of the writer on magnetic recording media. This dilemma is considered one of the most significant challenges to improving current writer designs and performance.

Referring to FIG. 1, internal flux loss is depicted in a conventional PMR writer 1 comprising a main pole 11 and shield 12 that can represent a trailing shield, side shield, or leading shield depending on the direction of movement of the writer over magnetic medium 10 during a write process. Magnetic charges 7a, 8a of opposite sign are shown on an air bearing surface (ABS) side of the shield 12, and main pole 11, respectively, and are responsible during a write process for the preferred direction 5 of flux Bs1 from the main pole to the magnetic medium, and returning from the magnetic medium to the shield. Magnetic flux Bs0 is provided to the main pole from coils (not shown). As the gap (distance) between main pole and shield becomes smaller, flux loss Bs2 in a direction 6 from main pole to shield becomes more severe due to magnetic charges 7b, 8b on opposing sides of the shield, and main pole, respectively. Consequently, the write field Bs1 on the magnetic recording medium will be degraded. With the constraint of write field amplitude on the magnetic medium 10, further reduction of the gap between main pole and shields is not productive which limits achieving a higher recording area density. In particular, decreasing the write gap between main pole and trailing shield has been an effective way in improving field gradient and BPI during the past few years. However, current technology does not enable further field gradient improvement when the write gap shrinks below 20 nm. One possible reason is the magnetic charges 7b, 8b for main pole and trailing shield are more concentrated on opposing sides as pictured in FIG. 1 than on the ABS surface when the write gap becomes too narrow in conventional designs. Thus, an improved writer design is needed to minimize flux loss Bs2 and maximize write field Bs1.

A search of the prior art revealed the following references. U.S. Patent Application 2010/0157484 shows a magnetic field auxiliary pole and a non-magnetic layer stacked on the main pole to increase field strength and gradient. However, the stacked layers are recessed from the ABS and are not expected to entirely prevent flux leakage from the main pole to an adjacent trailing shield.

In U.S. Patent Application 2010/0149697, a trailing shield is shown with multiple layers and is separated from the trailing side of a main pole by a gap layer.

U.S. Pat. No. 7,657,992 discloses a small trailing shield stitched onto the main pole at the ABS but separated from the main pole by a write gap layer.

U.S. Pat. No. 6,530,141 describes a magnetic pole construction resulting in a high field gradient.

A. Hashimoto et al. describe the use of a negative Ku magnetic material in "A soft magnetic underlayer with negative uniaxial magnetocrystalline anisotropy for suppression of spike noise and wide adjacent track erasure in perpendicular magnetic recording media", Journal of Applied Physics, 99, 08Q907 (2006).

A composite grain of easy plane material (CoIr with negative Ku) and perpendicular anisotropy material (CoPt with positive Ku) are used in a magnetic medium to improve the head field gradient and amplitude as described by Park et al in "A novel crystalline soft magnetic intermediate layer for perpendicular recording media", Journal of Applied Physics, 105, 07B723 (2009), and in "Co-7% Ir Soft Magnetic Intermediate Layer for Perpendicular Media", IEEE Transactions on Magnetics, Vol. 46, No. 6, June 2010.

Takahashi et al. discuss structural and magnetic analyses of a'-Fe—C films in "Magnetocrystalline Anisotropy for a'-Fe—C and a'-Fe—N Films", IEEE Transactions on Magnetics, Vol. 37, No. 4, July 2001.

SUMMARY OF THE INVENTION

One objective of the present invention is to provide additional magnetic charge at the trailing edge of the recording field to improve field amplitude and field gradient at the ABS and thereby increase BPI as required for high area density PMR writers.

Another objective of the present invention is to provide a method of forming a PMR writer with improved field amplitude and field gradient according to the first objective.

According to the embodiments of the present invention, the first objective is achieved with a magnetic assist layer formed on a trailing side of a main pole and adjoining a write gap layer. The magnetic assist layer has a width in a cross-track direction that is essentially equal to that of the main pole track width, a thickness in a down track direction of 5 to 20 nm, and extends a distance of 100 to 500 nm from the ABS toward a back end of the PMR writer. Preferably, the magnetic assist layer is comprised of an anisotropic magnetic material. In one embodiment, the magnetic assist layer (MAL) has a negative crystalline anisotropy energy constant (−Ku) at room temperature. Alternatively, the magnetic assist layer has a positive crystalline anisotropy constant (+Ku). A magnetic assist layer with a (−Ku) energy constant may be deposited on a seed layer such as Ru that aligns the c-axis (hard axis) of the hexagonal crystalline MAL structure toward the main pole. The c-axis (hard axis) is preferably aligned toward the main pole for a MAL with (−Ku) energy constant while the c-axis is preferably vertical to the ABS for a MAL with a (+Ku) energy constant. Thus, magnetization of the magnetic assist layer can only be induced in a direction toward the main pole with a strong magnetic field. Furthermore, the magnetic assist layer is totally soft in a 2D plane orthogonal to the hard axis which means the magnetization of the MAL can be easily induced in any direction orthogonal to the hard axis with a weak magnetic field. As a result, magnetic charges are minimized on the trailing side of the MAL facing the trailing shield such that flux loss from the main pole to the trailing shield is insignificant thereby increasing field amplitude and field gradient at the ABS According to a first embodiment, the shield structure may comprise a trailing shield, leading shield, and side shields. Moreover, the trailing shield may be a composite with a first layer adjoining the write gap made of a high Ms (24 kG) magnetic material and a second (19 kG) magnetic layer formed on a side of the first layer that faces away from the main pole. In one aspect, the shield structure may be an AWA design that completely surrounds the main pole. Furthermore, the main pole may have both of a tapered leading side and a tapered trailing side. A key feature is that a magnetic assist layer made of an anisotropic magnetic material is formed on a portion of the main pole trailing side and extends from the ABS toward the back end of the main pole. In a first embodiment, the MAL is formed along the tapered trailing side of the main pole and continues along a portion of the trailing side that connects the tapered trailing side with a back end of the main pole. The present invention also encompasses a second embodiment wherein the magnetic assist layer is formed only along the tapered trailing side of the main pole.

A method is provided for forming a PMR writer with a magnetic assist layer comprised of an anisotropic magnetic material adjoining a trailing side of a main pole. According to one embodiment, a leading shield and a side shield layer made of an isotropic soft magnetic material are sequentially formed on a substrate. An opening with sidewalls is formed in the side shield to expose a portion of the leading shield top surface. Side gap and leading gap layers are conformally deposited in the opening followed by plating the main pole to fill the opening. After a CMP process to planarize the main pole, a taper may be formed on the main pole trailing side by ion beam milling. Then a non-magnetic seed layer, and an anisotropic (−Ku) magnetic assist layer are sequentially deposited on a portion of the main pole trailing side including the trailing edge. Alternatively, an anisotropic (+Ku) magnetic assist layer is directly deposited on the main pole trailing side by an oblique sputtering method. Subsequently, the write gap is deposited on the magnetic assist layer. Finally, the trailing shield is plated on the write gap to complete the shield structure.

BRIEF DESCRIPTION OF THE DRAWINGS

FIG. 1 is an oblique view of a prior art PMR writer where there is considerable flux loss from the main pole in a direction toward an adjacent shield.

FIG. 2 is an oblique view of a PMR writer with a shield made of an anisotropic magnetic material to minimize flux leakage from the main pole to an adjacent shield.

FIG. 3 is a cross-sectional view of a PMR writer structure previously fabricated by the inventors that has a composite trailing shield and a leading shield adjacent to a main pole with tapered leading and trailing sides.

DETAILED DESCRIPTION OF THE INVENTION

Figure 4:
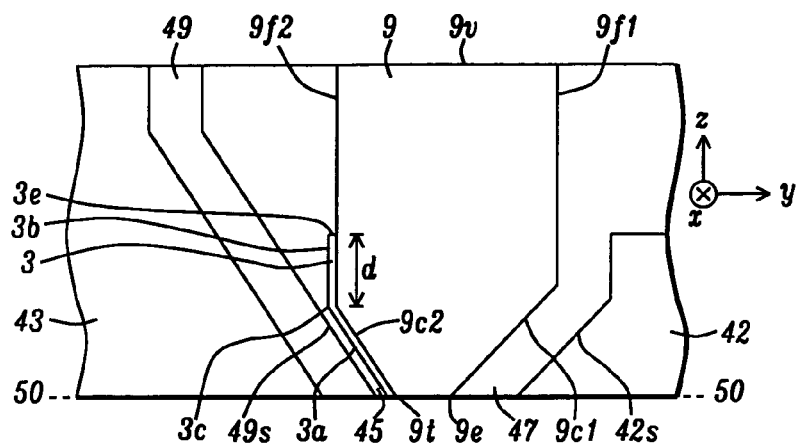
FIG. 4 is a cross-sectional view of a PMR writer formed according to an embodiment of the present invention wherein a magnetic assist layer made of an anisotropic magnetic material is formed along a trailing side of a main pole.

The present invention is a PMR writer design which takes advantage of the discovery that an anisotropic magnetic material may be used as a magnetic assist layer on a main pole trailing side to minimize flux loss from the main pole to a trailing shield and thereby maximize the flux field and field gradient at the main pole interface with the ABS. Although the exemplary embodiment depicts a trapezoidal shaped main pole at the ABS, the present invention also encompasses other main pole shapes. Furthermore, the main pole may have one or both of a tapered trailing edge and a tapered leading edge. Width in the context of shield structures and layers defined herein refers to a distance in a cross-track direction, and thickness or depth relates to a distance in a down-track direction. The gap layer as illustrated herein may not have a uniform thickness and the write gap portion between the main pole and trailing shield is typically thinner than the lead gap.

Referring to FIG. 2, we described in related patent application HT10-031 how a shield 20 made of anisotropic magnetic material and formed adjacent to a main pole 11 may be used to maximize the magnetic charges 7a, 8a at the ABS of shield 20, and main pole 11, respectively. In the absence of a strong magnetic field, there are essentially no magnetic charges formed on a side of the shield facing the main pole which prevents a portion of magnetic field Bs0 from being diverted to the shield. Thus, the magnetic field Bs1 at the ABS is maximized compared with the condition previously shown in FIG. 1 and the gap between main pole and trailing shield may be reduced with a minimum amount of flux loss to enable a significant gain in BPI for advanced PMR writer designs. Herein, we disclose additional PMR writer designs where an anisotropic magnetic layer is placed at other locations adjacent to a main pole to prevent flux loss to a trailing shield and increase the flux field and field gradient at the ABS.

Referring to FIG. 3, a cross-sectional view of a PMR writer previously fabricated by the inventors is shown having a main pole 9 formed along an ABS 50-50 and a trailing shield and leading shield 42 formed on either side of the main pole along the cross-track (x-axis) direction. The y-axis is the down-track direction while the z-axis direction is toward the back end 9v of the main pole. In the exemplary embodiment, there is a tapered leading side 9c1 formed at an angle θ1 with respect to a plane B-B aligned perpendicular to the ABS, and connected to a leading side 9f1 which terminates at the back end 9v. There is also a tapered trailing side 9c2 formed at an angle θ2 of about 0 to 45 degrees, and preferably 25 to 30 degrees, with respect to a plane A-A aligned perpendicular to the ABS, and connected to a trailing side 9f2 that terminates at the back end. Main pole 9 has a trailing edge 9t and leading edge 9e at the ABS, and is separated from leading shield 42 by a lead gap 47. In the exemplary embodiment, there is a composite trailing shield comprised of a high Ms (24 kG) magnetic shield layer 49 formed adjacent to a write shield 45 and a 19 kG magnetic shield layer 43 adjoining the high Ms layer on a side that faces away from the main pole. In one aspect, side 43s of the 19 kG magnetic shield layer that interfaces with high Ms shield layer 49, and side 49s of the high Ms shield layer that interfaces with write gap 45 may be formed substantially parallel to tapered trailing side 9c2.

Referring to FIG. 4, a first embodiment of the present invention is shown that retains all of the features of the PMR writer in FIG. 3 and also has a magnetic assist layer 3 made of an anisotropic magnetic material formed on tapered trailing side 9c2 and along a portion of trailing side 9f2 which is aligned perpendicular to the ABS. According to one embodiment, the magnetic assist layer has an anisotropy (−Ku) energy constant with a hard axis aligned toward the main pole 9. Alternatively, the magnetic assist layer may be comprised of a material such as CoPt or FePt having an anisotropy (+Ku) energy constant with a hard axis in a direction perpendicular to the ABS. In one aspect, the magnetic assist layer is comprised of a first section 3a that extends from the ABS 50-50 to a corner 3c where the tapered trailing side terminates, and a second section 3b which extends from the corner 3c to an end 3e which is a distance d along trailing side 9f2. Preferably, end 3e is a distance of 100 to 500 nm from the ABS. Moreover, magnetic assist layer 3 has a thickness in a y-axis direction of 5 to 20 nm. Typically, the write gap 45 has a thickness of about 20 to 30 nm between magnetic assist layer section 3a and side 49s of the first trailing shield layer. Note that FIG. 4 is a cross-sectional view taken along the plane 2-2 in the ABS view illustrated in FIG. 5. It should be understood that the magnetic assist layer 3 also provides an improvement in writability in an embodiment (not shown) wherein the trailing shield is a single layer made of isotropic magnetic material such as CoFeNi or CoFe.

Figure 5:
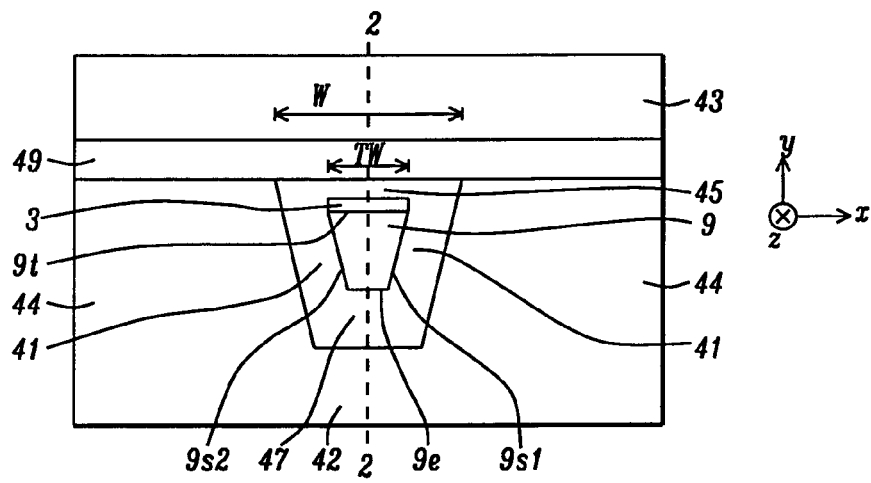
FIG. 5 is an ABS view of the embodiment depicted in FIG. 4 and further includes side shields that connect with the trailing shield and leading shield.

Referring to FIG. 5, the first embodiment anticipates that the shield structure further includes side shields 44 that connect with first trailing shield layer 49 and leading shield 42 to form an AWA shield structure. However, it should be understood that the magnetic assist layer 3 of the present invention is equally beneficial in increasing flux amplitude and improving field gradient at the ABS if a partial side shield structure is employed. The plane 2-2 bisects the main pole in a down-track (y-axis) direction. In the exemplary embodiment, the main pole 9 has a trapezoidal shape with a leading edge 9e having a smaller width in a cross-track (x-axis) direction than the trailing edge 9t. Sloped sides 9s1, 9s2 of the main pole are adjoined by a side gap 41 made of a dielectric material. Main pole 9 may include a seed layer (not shown) along sides 9s1, 9s2 and along leading edge 9e that facilitates a deposition method wherein main pole material is plated in an opening (not shown) bounded by side gaps 41 and lead gap 47. In the exemplary embodiment, the side gap has a uniform width in the x-axis direction and conforms to the shape of the sides 9s1, 9s2. There is also a write gap 45 having a width w that adjoins a top surface of each side gap 41 and interfaces with the magnetic assist layer (MAL) 3 along a side of the MAL that faces away from the trailing edge 9t. The write gap may be comprised of the same dielectric material as in the side gap. A leading gap 47 interfaces with the leading edge 9e and adjoins a bottom surface of each side gap. Thus, there is a gap layer completely surrounding main pole 9 but the thickness along the plane 2-2 is typically less for the write gap 45 than for leading gap 47. The width of the trailing edge 9t is referred to as the track width TW and is preferably the same as the width of the magnetic assist layer 3.

Figure 6:
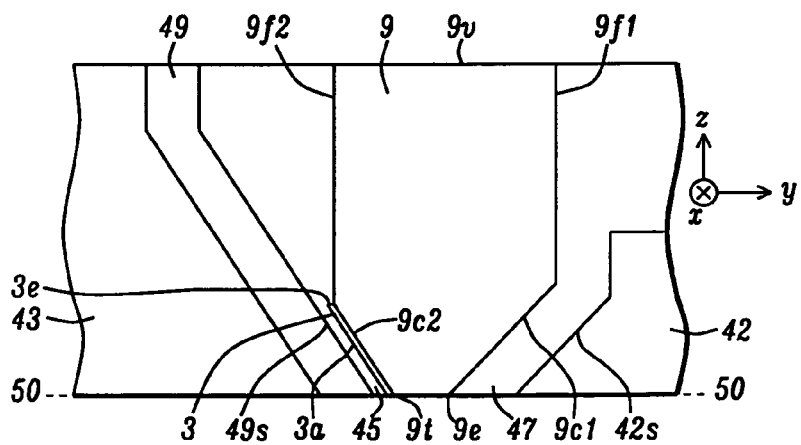
FIG. 6 is a cross-sectional view of a PMR writer according to a second embodiment of the present invention wherein a magnetic assist layer comprising an anisotropic magnetic material is formed only along a tapered trailing side of a main pole.

In an alternative embodiment shown in FIG. 6, the magnetic assist layer may be formed only along tapered trailing side 9c2 and terminates at corner 3c where trailing side 9f2 connects with tapered trailing side 9c2. In other words, the alternative embodiment in FIG. 6 is the same as the first embodiment in FIG. 4 except the magnetic assist layer is shortened in vertical height with respect to the ABS and is not formed along the section of trailing side 9f2 that is perpendicular to the ABS 50-50.

According to embodiments relating to a magnetic assist layer made of an anisotropy (−Ku) magnetic material, a non-magnetic seed layer 62 (FIG. 9) may be formed between the MAL 3 and the main pole 9 in order to induce the hard axis of the MAL in a direction perpendicular to the trailing edge 9t and perpendicular to tapered trailing side 9c2, and to trailing side 9f2 (FIG. 4). Furthermore, the non-magnetic layer 62 prevents exchange coupling between the magnetic assist layer and the isotropic magnetic material in the main pole. Preferably, the non-magnetic seed layer is made of Ru with a thickness from 5 to 20 Angstroms. Optionally, the non-magnetic seed layer is omitted and a hard axis is induced in the magnetic assist layer 3 by sputter depositing the MAL at a tilted angle with respect to the ABS.

A key feature is that the magnetic assist layer is preferably comprised of an anisotropic magnetic material which may have a (−Ku) crystalline energy constant such as hcp-CoIr wherein the Ir content is from 10 to 40 atomic %, and preferably between 17 and 22 atomic %, dhcp-CoFe, a'-Fe—C, or NiAs-type $Mn_{50}Sb_{50}$. The present invention also anticipates that the magnetic assist layer may be comprised of an anisotropic magnetic material such as CoPt or FePt with a (+Ku) crystalline energy constant. As a result of incorporating a magnetic assist layer 3 adjacent to a trailing side of the main pole, the write gap thickness may be thinner than in prior art shield designs thereby enabling a higher BPI than previously realized. Note that side shields 44 adjoin side gap 41 on either side of main pole 9, and leading shield 42 interfaces with leading gap 47 and side shields in FIG. 5. A bottom surface of first trailing shield layer 49 contacts side shield sections 44 at distances greater than ½ w from the center plane 2-2. Side shields 44 and leading shield 42 may be formed of the same soft magnetic material as in second trailing shield layer 43.

Figure 7:
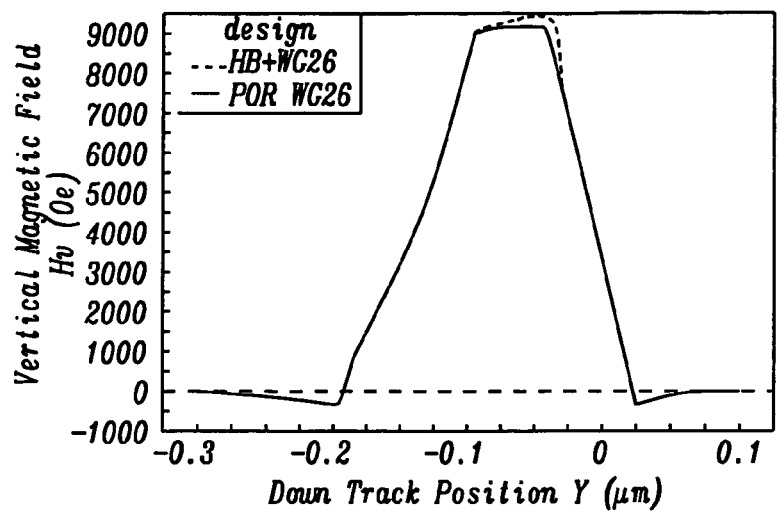
FIG. 7 is a plot of vertical magnetic field vs. down-track position for the PMR writer structures depicted in FIGS. 3 and 4.

Referring to FIG. 7, a plot of vertical magnetic field profile along the down-track direction is shown for the PMR writers in FIG. 3 (solid line) and in FIG. 4 (dashed line), respectively. In each case, the write gap thickness is held constant at 26 nm and the track width is 60 nm. The results (dashed line) that represent an embodiment of the present invention were generated with an assisted magnetic layer thickness of 5 nm, and a vertical height (distance between ABS and end of MAL) of 200 nm. The overwrite is improved by 4 dB with the example in FIG. 4 when the magnetic assist layer has a 1 Telsa Ms and 1 Telsa Hk along a direction perpendicular to the ABS. A gain in both field amplitude and field gradient is observed for the design with the magnetic assist layer. Additional improvement may be realized with adjustments in the geometry of the magnetic assist layer and in its magnetic property.

Figure 8:
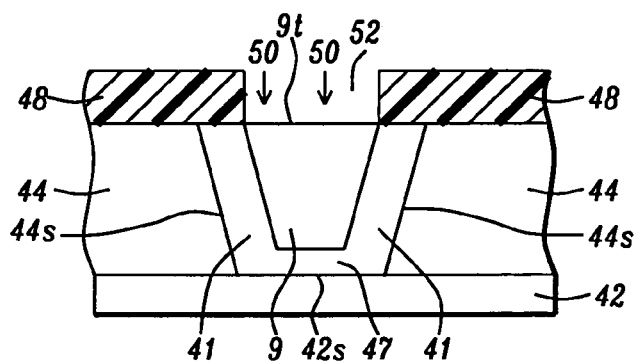
FIGS. 8-12 show intermediate steps during the fabrication of the PMR writer depicted in FIG. 4.

Referring to FIG. 8, an ABS view of an intermediate structure formed during the fabrication of a PMR writer according to the first embodiment (FIG. 4) is shown. A leading shield 42 and side shield layer 44 are sequentially formed on a substrate (not shown) by a conventional plating method. Next, an opening (not shown) that is bounded by sidewalls 44s and top surface 42s is formed in the side shield layer 44 by a well known photoresist patterning and ion beam milling (IBE) sequence. A dielectric material is deposited in the opening to form lead gap 47 on a portion of top surface 42s, and to form a side gap 41 on sidewalls 44s. Thereafter, main pole 9 is plated on side gap 41 and lead gap 47 to fill the opening. Typically, a chemical mechanical polish (CMP) process is used to form a main pole top surface including trailing edge 9t that is coplanar with top surfaces of side shields 44 and side gaps 41. A photoresist layer 48 is coated on the side shields, side gaps, and main pole and then patterned to form an opening 52 that uncovers a portion of main pole top surface including leading edge 9t. An ion beam milling process that comprises ion beams 50 is employed to taper the trailing side (9f2 in FIG. 4) and form a tapered side 9c2 having a taper angle θ2 as depicted in FIG. 3. Note that the tapered leading side 9c1 connected to leading side 9f1 may be formed by a standard process prior to ion beam milling process which tapers the trailing side.

Figure 9:
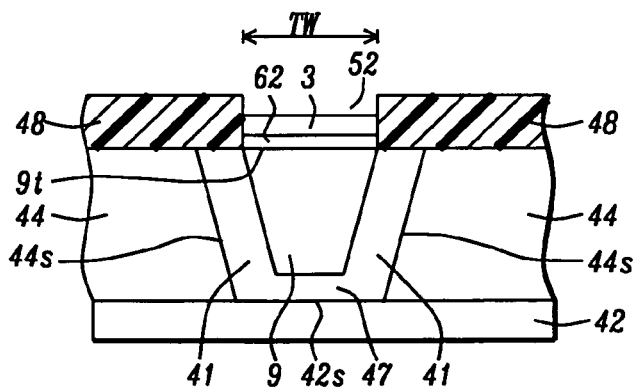

Referring to FIG. 9, photoresist layer 48 remains in place while a non-magnetic seed layer 62 preferably made of Ru is sputter deposited on the tapered side 9c1 within opening 52 according to one process flow sequence. Next, the magnetic assist layer 3 is sputter deposited on the non-magnetic seed layer. In a preferred embodiment, the MAL is made of $Co_{83}Ir_{17}$ although an Ir content between 10 and 40 atomic % is also acceptable. The MAL 3 and non-magnetic seed layer 62 have essentially the same width as the TW for trailing edge 9t. The photoresist mask 48 is now removed by a standard method.

Figure 10:
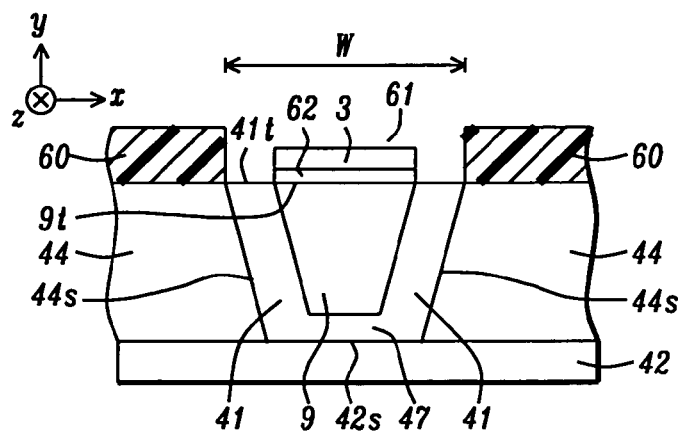

Referring to FIG. 10, a second photoresist layer 60 is coated on side shields 44, side gaps 41, and on magnetic assist layer 3, and is then patterned to form an opening 61 which uncovers the MAL and a top surface 41t of each side gap. The size of the opening 61 corresponds to the desired width w (and length in a z-axis direction which is not shown) of the subsequently deposited write gap.

Figure 11:
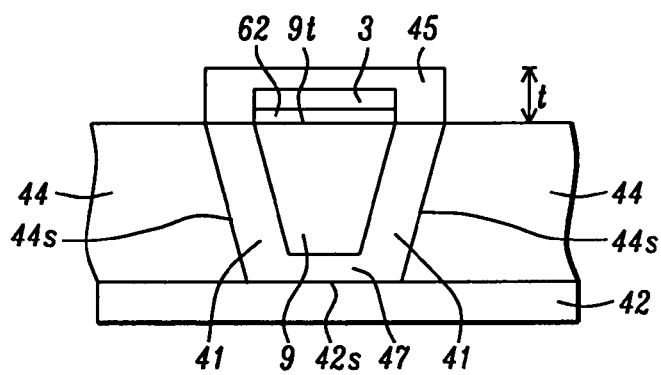

Referring to FIG. 11, a write gap layer is deposited by an atomic layer deposition (ALD) method to form a conformal write gap 45 on the tapered main pole trailing side 9c2 (not shown) including magnetic assist layer 3, and on side gap top surfaces 41t. Preferably, the write gap has a thickness of about 20 to 30 nm above the side gap 41. Thereafter, the second photoresist layer is stripped by a conventional process.

Figure 12:
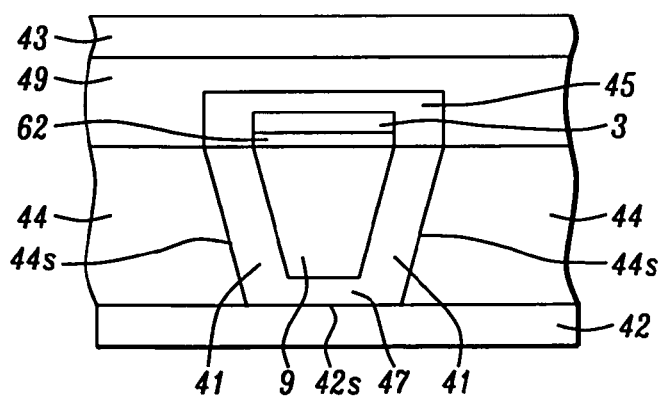

Referring to FIG. 12, the high Ms (24 kG) trailing shield layer 49 is plated by a well known method followed by plating the 19 kG trailing shield layer 43 to complete the shield structure for the PMR writer.

Figure 13:
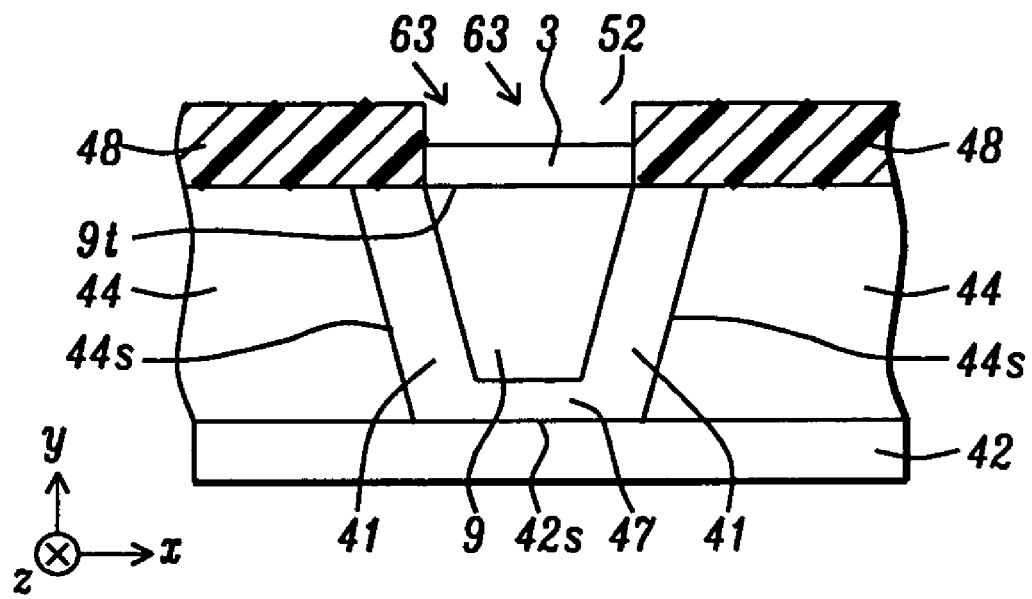
FIG. 13 shows an alternative method of forming a magnetic assist layer made of an anisotropic magnetic material on a main pole trailing side.

Referring to FIG. 13, an alternative process flow sequence that relates to a magnetic assist layer having a (+Ku) crystalline energy constant is shown and begins with the intermediate structure shown in FIG. 8. In this case, a non-magnetic seed layer is not deposited and the MAL 3 made of CoPt or FePt, for example, is deposited by a tilted (oblique) angle sputter deposition method. The resulting magnetic assist layer is exchange coupled with the main pole 9 and has anisotropy induced in a direction perpendicular to the ABS along a z-axis direction. Thereafter, the processes described with respect to FIGS. 10-12 are followed to form the write gap and trailing shield structure.

The advantages of the present invention are that flux leakage from a main pole to a trailing shield is significantly reduced compared with prior art shield designs such that BPI is improved to enable higher performance in advanced PMR writer designs. Furthermore, write field amplitude and field gradient are improved over a prior art design that does not have a magnetic assist feature on the main pole when a constant write gap distance is employed.

While this invention has been particularly shown and described with reference to, the preferred embodiment thereof, it will be understood by those skilled in the art that various changes in form and details may be made without departing from the spirit and scope of this invention.

We claim:

1. A perpendicular magnetic recording (PMR) writer, comprising:
    (a) a main pole comprised of a trailing side and a leading side with respect to a down-track direction, the leading side has a leading edge at an air bearing surface (ABS) and the trailing side has a trailing edge at the ABS and is further comprised of a tapered trailing side section that extends from the ABS to a section of trailing side that is aligned perpendicular to the ABS;
    (b) a gap layer adjacent to and surrounding the main pole at the ABS wherein said gap layer comprises a write gap formed along the trailing edge and trailing side including the tapered trailing side section;
    (c) a magnetic assist layer comprising an anisotropic magnetic layer formed between the write gap and the tapered trailing side section; and
    (d) a shield structure comprising a trailing shield that adjoins a side of the write gap that faces away from the main pole.

2. The PMR writer of claim 1 wherein the magnetic assist layer has a thickness between about 5 and 20 nm in the down-track direction.

3. The PMR writer of claim 2 wherein the magnetic assist layer has a (−Ku) crystalline energy constant and is made of hcp-CoIr wherein the Ir content is between about 10 and 40 atomic %, dhcp-CoFe, a'-Fe—C, or NiAs-type $Mn_{50}Sb_{50}$.

4. The PMR writer of claim 1 wherein the magnetic assist layer has a (+Ku) crystalline energy constant and is made of CoPt or FePt.

5. The PMR writer of claim 3 further comprised of a non-magnetic seed layer made of Ru formed between the tapered trailing side section and the magnetic assist layer.

6. The PMR writer of claim 1 wherein the magnetic assist layer has a width in a cross-track direction that is equal to a track width of the trailing edge.

7. The PMR writer of claim 1 wherein the magnetic assist layer extends a distance between about 100 and 500 nm from the ABS towards a back end of the main pole.

8. A perpendicular magnetic recording (PMR) writer, comprising:
    (a) a main pole comprised of a trailing side and a leading side with respect to a down-track direction, the leading side has a leading edge at an air bearing surface (ABS) and the trailing side has a trailing edge at the ABS and is further comprised of a tapered trailing side section that extends from the ABS to a section of trailing side that is aligned perpendicular to the ABS;
    (b) a gap layer adjacent to and surrounding the main pole at the ABS wherein said gap layer comprises a write gap formed along the trailing edge and trailing side including the tapered trailing side section;
    (c) a magnetic assist layer made of an anisotropic magnetic layer and comprising a first section formed between the write gap and the tapered trailing side section, and a second section formed between the write gap and a portion of the trailing side section that is aligned perpendicular to the ABS; and
    (d) a shield structure comprising a trailing shield that adjoins a side of the write gap that faces away from the main pole.

9. The PMR writer of claim 8 wherein the magnetic assist layer has a thickness between about 5 and 20 nm in a down-track direction.

10. The PMR writer of claim 9 wherein the magnetic assist layer has a (−Ku) crystalline energy constant and is made of hcp-CoIr wherein the Ir content is between about 10 and 40 atomic %, dhcp-CoFe, a'-Fe—C, or NiAs-type $Mn_{50}Sb_{50}$.

11. The PMR writer of claim 10 further comprised of a non-magnetic seed layer made of Ru formed between the tapered trailing side section and the magnetic assist layer, and between the magnetic assist layer and the portion of trailing side section that is aligned perpendicular to the ABS.

12. The PMR writer of claim 8 wherein the magnetic assist layer has a (+Ku) crystalline energy constant and has a magnetization in a direction perpendicular to the ABS and toward a back end of the main pole.

13. The PMR writer of claim 8 wherein the magnetic assist layer extends a distance between about 100 and 500 nm from the ABS towards a back end of the main pole.

14. The PMR writer of claim 8 wherein the magnetic assist layer has a width in a cross-track direction that is equal to a track width of the trailing edge.

15. A method of fabricating a PMR writer with a magnetic assist layer formed adjacent to a trailing side of a main pole at an air bearing surface (ABS), comprising:
   (a) sequentially forming a leading shield layer and a side shield layer on a substrate, said side shield layer has an opening formed therein which is bounded by side shield sidewalls and a top surface of the leading shield layer;
   (b) depositing a side gap along the side shield sidewalls and a leading gap on the top surface of the leading shield layer;
   (c) plating a main pole layer on the side gap and leading gap to fill the opening in the side shield layer, and planarizing a top surface of the main pole to be coplanar with the side shield layer and thereby forming a main pole trailing side with a trailing edge at the ABS;
   (d) depositing a magnetic assist layer made of an anisotropic magnetic material on a portion of the main pole trailing side including the trailing edge;
   (e) depositing a write gap on the magnetic assist layer and on a top surface of the side gap; and
   (f) plating a trailing shield on the write gap and portions of the side shield layer.

16. The method of claim 15 further comprised of tapering a section of the trailing side of the main pole after the planarizing step and prior to depositing the magnetic assist layer, the tapered section connects the trailing edge at the ABS to a section of trailing side that is aligned perpendicular to the ABS.

17. The method of claim 15 wherein the magnetic assist layer is comprised of an anisotropic (−Ku) magnetic material such that the hard axis of the magnetic assist layer is aligned in a direction toward the main pole trailing side.

18. The method of claim 17 further comprised of depositing a non-magnetic seed layer on the main pole trailing side prior to depositing the magnetic assist layer.

19. The method of claim 15 wherein the magnetic assist layer is made of an anisotropic (+Ku) magnetic material.

20. The method of claim 19 wherein the magnetic assist layer is deposited by a tilted angle sputter technique to form a hard axis aligned perpendicular to the ABS.

21. The method of claim 15 wherein the magnetic assist layer has a thickness between about 5 to 20 nm in a down-track direction and a width in a cross-track direction that is equal to a track width of the trailing edge.

22. The method of claim 15 wherein the magnetic assist layer extends a distance between about 100 and 500 nm from the ABS towards a back end of the main pole.

23. The method of claim 16 wherein the magnetic assist layer is formed on the tapered section of trailing side and on a portion of the trailing side section aligned perpendicular to the ABS.

* * * * *